US011258730B2

(12) United States Patent
Ferrari et al.

(10) Patent No.: US 11,258,730 B2
(45) Date of Patent: Feb. 22, 2022

(54) GENERATING A PLURALITY OF SELECTABLE RESPONSES BASED ON A DATABASE INDEXED BY RECEIVER DEVICES STORING RESPONSES TO SIMILAR SMS MESSAGES

(71) Applicant: Go Daddy Operating Company, LLC, Scottsdale, AZ (US)

(72) Inventors: Francesco Maria Ferrari, San Diego, CA (US); Yuhan Chen, San Diego, CA (US); Siddharth Dinesh, San Diego, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 205 days.

(21) Appl. No.: 16/294,662

(22) Filed: Mar. 6, 2019

(65) Prior Publication Data

US 2020/0287850 A1     Sep. 10, 2020

(51) Int. Cl.
*H04L 12/58*     (2006.01)
*G06K 9/62*     (2006.01)
(Continued)

(52) U.S. Cl.
CPC ........ *H04L 51/02* (2013.01); *G06F 16/90332* (2019.01); *G06K 9/6276* (2013.01); *G06Q 30/0281* (2013.01); *H04W 4/14* (2013.01)

(58) Field of Classification Search
CPC .. H04L 51/02; G06Q 30/0281; G06K 9/6276; G06F 16/90332; G06F 16/958; H04W 4/14; H04W 4/21

(Continued)

(56) References Cited

U.S. PATENT DOCUMENTS 9,071,974 B2 *   6/2015   McKay ................... H04L 63/14
9,100,809 B2 *   8/2015   Olincy ............... H04M 3/42365
(Continued)

OTHER PUBLICATIONS

3elinkow et al., VectorSLU: A Continuous Word Vector Approach to Answer Selection in Community Question Answering Systems, Proceedings of the 9th International Workshop on Semantic Evaluation (SemEval 2015), Denver Colorado, Jun. 4-5, 2015, pp. 282-287, (Year: 2015).*

(Continued)

*Primary Examiner* — Akwasi M Sarpong
(74) *Attorney, Agent, or Firm* — Greenberg Traurig, LLP

(57) ABSTRACT

A method is provided to receive an SMS message from a sender device addressed to a receiver device. Similar SMS messages addressed to the receiver device are determined. One or more of the most common responses to the similar SMS messages are determined. One or more of the most common responses are transmitted as selectable responses to the receiver device. A selected response is sent to the sender device. Another method is provided to receive an SMS message from a sender device and transmit the SMS message to a receiver device. A response from the receiver device may be received and transmit to the sender device. The SMS messages and responses collected by repeating this process may be stored in a database so that the most frequently asked questions and their corresponding most frequent answers may be determined. The most frequently asked questions and their corresponding answers may be used to build a webpage of a website.

20 Claims, 14 Drawing Sheets

(51) Int. Cl.
*G06F 16/9032* (2019.01)
*G06Q 30/02* (2012.01)
*H04W 4/14* (2009.01)

(58) Field of Classification Search
USPC .................................................... 704/9, 205
See application file for complete search history.

(56) References Cited

U.S. PATENT DOCUMENTS

| | | | | |
|---|---|---|---|---|
| 9,565,305 | B2* | 2/2017 | Chakravarthy | H04W 4/021 |
| 2002/0026435 | A1* | 2/2002 | Wyss | G06Q 10/107 |
| 2008/0052063 | A1* | 2/2008 | Bennett | G10L 15/005 |
| | | | | 704/8 |
| 2008/0263169 | A1* | 10/2008 | Brabec | H04L 65/102 |
| | | | | 709/206 |
| 2010/0145694 | A1* | 6/2010 | Ju | G10L 15/22 |
| | | | | 704/235 |
| 2011/0055309 | A1* | 3/2011 | Gibor | H04L 69/18 |
| | | | | 709/202 |
| 2012/0259620 | A1* | 10/2012 | Vratskides | G06F 40/00 |
| | | | | 704/9 |
| 2014/0189027 | A1* | 7/2014 | Zhang | H04L 51/02 |
| | | | | 709/206 |
| 2015/0363384 | A1* | 12/2015 | Williams | G06F 40/30 |
| | | | | 704/9 |
| 2017/0103069 | A1* | 4/2017 | Brennan | G06F 16/2455 |
| 2017/0140474 | A1* | 5/2017 | Tran | G06Q 50/01 |
| 2017/0316775 | A1* | 11/2017 | Le | G10L 15/16 |
| 2018/0096278 | A1* | 4/2018 | Lev-Tov | G06Q 10/06395 |
| 2018/0150607 | A1* | 5/2018 | MacLeod | G16H 10/20 |
| 2018/0276525 | A1* | 9/2018 | Jiang | G06F 16/3329 |
| 2018/0316630 | A1* | 11/2018 | Jacobson | H04L 67/10 |
| 2018/0375877 | A1* | 12/2018 | Jakobsson | G06F 16/955 |
| 2019/0065576 | A1* | 2/2019 | Peng | G06F 16/22 |
| 2019/0171775 | A1* | 6/2019 | Martin | G06F 16/901 |
| 2019/0260694 | A1* | 8/2019 | Londhe | G06N 20/00 |

OTHER PUBLICATIONS

Belinkow et al., "VectorSLU: A Continuous Word Vector Approach to Answer Selection in Community Question Answering Systems," Proceedings of the 9th International Workshop on Semantic Evaluation (SemEval 2015), Denver, Colorado, Jun. 4-5, 2015, pp. 282-287, https://doi.org/10.18653/v1/S15-2048 [doi.org].

Chakravarthi et al., "Building Smart Replies for Member Messages" dated Oct. 24, 2017, 6 pages [online] [retrieved on Mar. 6, 2019], Retrieved from <URL: https://engineering.linkedin.com/blog/2017/10/building-smart-replies-for-member-messages>.

Kannan et al., "Smart reply: Automated response suggestion for email," In Proceedings of the 22nd ACM SIGKDD International Conference on Knowledge Discovery and Data Mining, Aug. 2016, 10 pages.

* cited by examiner

Database 150

| Index | SMS Question 115 | Question Vector 125 | Response/Selected Response 145 |
|---|---|---|---|
| Receiver Device #1 160 | Do you deliver | Question-Vector(1, .5, 3, 28, 6, .2) | Yes. Depends on how far you are. We may charge differently. |
| | Where are you located | Question-Vector(3, 7, .4, 13, 1, 0) | Off of W. Reno and Council Rd. If you know where the outlet mail is. I am just one minute away from that. |
| | How much is a full size bed | Question-Vector(2, 8, 22, .4, 11.2, 1) | Hello, they start at 140.00 plus tax and go up from there. |
| | What time are you open tomorrow? | Question-Vector(0, 0, 24, 13, 3, 2) | We open at 08:45 AM tomorrow |
| | Are you open on Sundays? | Question-Vector(1, 5, 0, .2, 11.9, 3) | Sorry, we are closed Sunday |
| | What time do you close today? | Question-Vector(4, 2, 0, .2, 1.1, 33) | We close at 06:00 PM today. |
| | What time are you open tomorrow? | Question-Vector(0, 0, 24, 13, 3, 2) | We open at 08:45 AM tomorrow |

FIG. 5A

Database 150

| Index | SMS Question 115 | Question Vector 125 | Response/Selected Response 145 |
|---|---|---|---|
| Receiver Device #2 500 | Are you open on Sundays? | Question-Vector(1, 5, 0, .2, 11.9, 3) | Yes, we are open 9:00 AM to 5:00 PM on Sundays. |
| | Do you have support staff to help set up your products? | Question-Vector(1, 3, .1, 12, 2.9, 28) | We have fully trained staff to help you with all of your needs. |
| | What is your address? | Question-Vector(2, 8, .5, 3, 0, 1) | 1234 Main Street, NY, NY |
| Receiver Device #3 510 | Do you sell bicycles for kids | Question-Vector(23, 11, 2, 0, 1, .6) | Yes, we have a wide range of bicycles for all age groups. |
| | What time are you open tomorrow? | Question-Vector(0, 0, 24, 13, 3, 2) | We open at 07:30 AM tomorrow. |
| | Are you open on Sundays? | Question-Vector(1, 5, 0, .2, 11.9, 3) | We are open from 10:00 AM to 3:00 PM on Sundays. |
| | Do you fix flat tires? | Question-Vector(9, 0, 1, .3, 1, 19) | Yes, we fix flat tires of all sizes. |

FIG. 5B

GENERATING A PLURALITY OF SELECTABLE RESPONSES BASED ON A DATABASE INDEXED BY RECEIVER DEVICES STORING RESPONSES TO SIMILAR SMS MESSAGES

FIELD OF THE INVENTION

The present invention generally relates to the fields of Short Message Service (SMS) messaging and generating webpages based on SMS messages.

SUMMARY OF THE INVENTION

One or more servers may receive a plurality of SMS messages from a plurality of sender devices. Each SMS message is addressed to a receiver device, in a plurality of receiver devices.

An intent classifier may determine whether the SMS message is requesting information and is thus an SMS question. As a non-limiting example, this may be determined using a training model. The training model may be trained on a training set using past text messages and data representing whether the text messages are or are not questions. Humans may be used to determine whether the text messages are or are not questions. Once the training model is trained, it may be used as part of the intent classifier to determine whether incoming text messages are or are not questions. In this embodiment, the intent classifier is not rule-based, but instead it's a function approximator which learns the typical structure of a question.

As other non-limiting examples, the intent classifier may determine whether the SMS message starts with "Who," "What," "Where," "When," or "How" and/or ends with a question mark. SMS messages that starts with "Who," "What," "Where," "When," or "How" and/or end with a question mark may be determined to be SMS questions. In preferred embodiments, SMS messages that are determined to not be SMS questions are not stored in the database, but instead are merely transmitted to the receiver device without further processing.

An encoder may convert each SMS question received from the sender devices into a question vector having a plurality of dimensions. Each dimension of the question vector may mathematically represent a characteristic of the SMS question. Once each SMS question is encoded into a question vector, the question vectors that are close to each other in high dimensional space are likely to be close to each other in meaning, while question vectors that are far apart from each other in high dimensional space are likely to have different meanings from each other. While any number of dimensions may be used, in preferred embodiments, each question vector has at least 100 dimensions and more preferably has at least 300, 1000 or more dimensions.

Any desired characteristics of the SMS questions may be used as one of the dimensions. As a non-limiting example, a neural network may be used for embedding, such as the Universal Language Encoder).

As another non-limiting example, a first dimension may represent a first word in the SMS question, a second dimension may represent a second word in the SMS question and so on for as many words as desired in the SMS question. If the SMS question has fewer words than words used for dimensions, a default value, such as zero, may be used for non-existent words. Preselected words, articles, words that carry little meaning and/or are shorter than four letters may be ignored. In other embodiments only nouns and verbs from the SMS question are used to encode into dimensions.

A similarity engine may determine a plurality of most similar question vectors from a plurality of question vectors that have all been received by the same receiver device. The plurality of most similar question vectors may be determined based on being mathematically closer to the question vector in high dimensional space as compared to other question vectors in the plurality of receiver device question vectors. Any method of determining how close question vectors are in high dimensional space may be used.

Question vectors and responses/selected responses may be stored in a database, preferably indexed by a receiver device. This allows one database to be used by a plurality of receiver devices as the data may be grouped/indexed by each receiver device. Thus, in preferred embodiments, the plurality of receiver device question vectors are all derived from SMS questions addressed to the receiver device and the plurality of receiver device question vectors do not include SMS questions not addressed to the receiver device.

Once the plurality of most similar question vectors has been found, a corresponding plurality of most common responses connected to the plurality of most similar question vectors may be determined from the database. Specifically, all of the responses may be determined from the plurality of most similar question vectors and then the most common of all of the responses may be determined to be the plurality of most common responses. In some cases, only a single response may be determined as the most common response or two or three responses may be determined as the most common responses. Thus, the plurality of most common responses may be based on a history of SMS message, stored in the database, received by the receiver device.

The SMS message and one or a plurality of most common responses may be transmitted to the receiver device. In preferred embodiments, the most common responses are displayed and selectable on the receiver device. This allows a business operator or agent operating the receiver device to select a common response to similar questions merely by tapping on a selected response as opposed to the business operator or agent having to type the message into the receiver device.

The SMS question, question vector and/or the entered or selected response may be stored in the database. The SMS question, question vector and/or the entered or selected response are preferably associated with each other and placed in a device group indexed by the receiver device. In other words, the data is grouped or indexed according to the receiver device that actually received the SMS question and entered/selected the response.

In another embodiment, the plurality of SMS messages may be received from a plurality of sender devices. The plurality of SMS messages are preferably all addressed to the same receiver device and each SMS message in the plurality of SMS messages comprises a string of characters. Each SMS message in the plurality of SMS messages may be transmitted to the receiver device. Some of the SMS messages may be determined to be questions using an intent classifier as previously discussed.

A response may be received to each of the SMS questions in the plurality of SMS questions from the receiver device. The response for each of the SMS questions may be transmitted to the sender device that sent the SMS message. The plurality of SMS messages and/or SMS questions and the corresponding plurality of responses may be stored, indexed according to the receiver device, in a database.

A plurality of most frequently asked questions in the plurality of SMS messages or SMS questions may be determined. This may be performed by encoding all of the SMS questions into question vectors as previously described. All of the SMS question vectors that are within a predetermined mathematical distance in high dimension space may be considered as one question. The most frequently asked questions may then be determined by counting the times each question (or closely related group of questions) has been asked. The questions or closely related group of questions that have been asked the most times by various sender devices to the same receiver device may be determined to be the plurality of most frequently asked questions.

For each question in the plurality of most frequently asked questions a most frequent answer may be determined so that each question in the plurality of most frequently asked questions corresponds to an answer. Thus, a plurality of most frequent answers may be generated where each answer corresponds to one of the plurality of most frequently asked questions.

A website may be determined that corresponds to the receiver device using any desired method. As a non-limiting example, the website may be automatically determined, by one or more servers, from a customer account of the business with the receiver device. In another embodiment, a business operator or agent may enter website(s) that are related to the communications with the receiver device.

One or more servers may generate computer code for a webpage for the website, determined to be associated with the receiver device, using the plurality of most frequently asked questions and their corresponding plurality of most frequent answers. In a preferred embodiment, the computer code of the webpage for the website presents the plurality of most frequently asked questions in order from most frequent to least frequent followed by the most frequent answer to its corresponding question. While the computer code may be in any computer language, in preferred embodiments the computer code is written in HTML.

The computer code may be transmitted to one or more hosting servers. The computer code may be used by the one or more hosting servers to update the computer code for the website so that the website now displays a new or updated webpage with the most frequently asked questions and their corresponding most frequent answer.

The one or more servers may publish the website, with the generated webpage, to the Internet. Thus, the website may include the webpage generated from SMS messages, stored in the database, received by and transmitted from the receiver device.

The above features and advantages of the present invention will be better understood from the following detailed description taken in conjunction with the accompanying drawings.

BRIEF DESCRIPTION OF THE DRAWINGS

FIGS. 5A and 5B illustrate an example database that may be used in accordance with the invention. The database may index SMS Questions, Question Vectors and Responses/Selected Responses by a receiving device. This allows the database to be used to determine the most frequent response(s) to similar questions for each receiving device in a plurality of receiving devices and/or the most frequently asked questions with the most frequent answers for each receiving device in the plurality of receiving devices.

DETAILED DESCRIPTION

Figure 1:
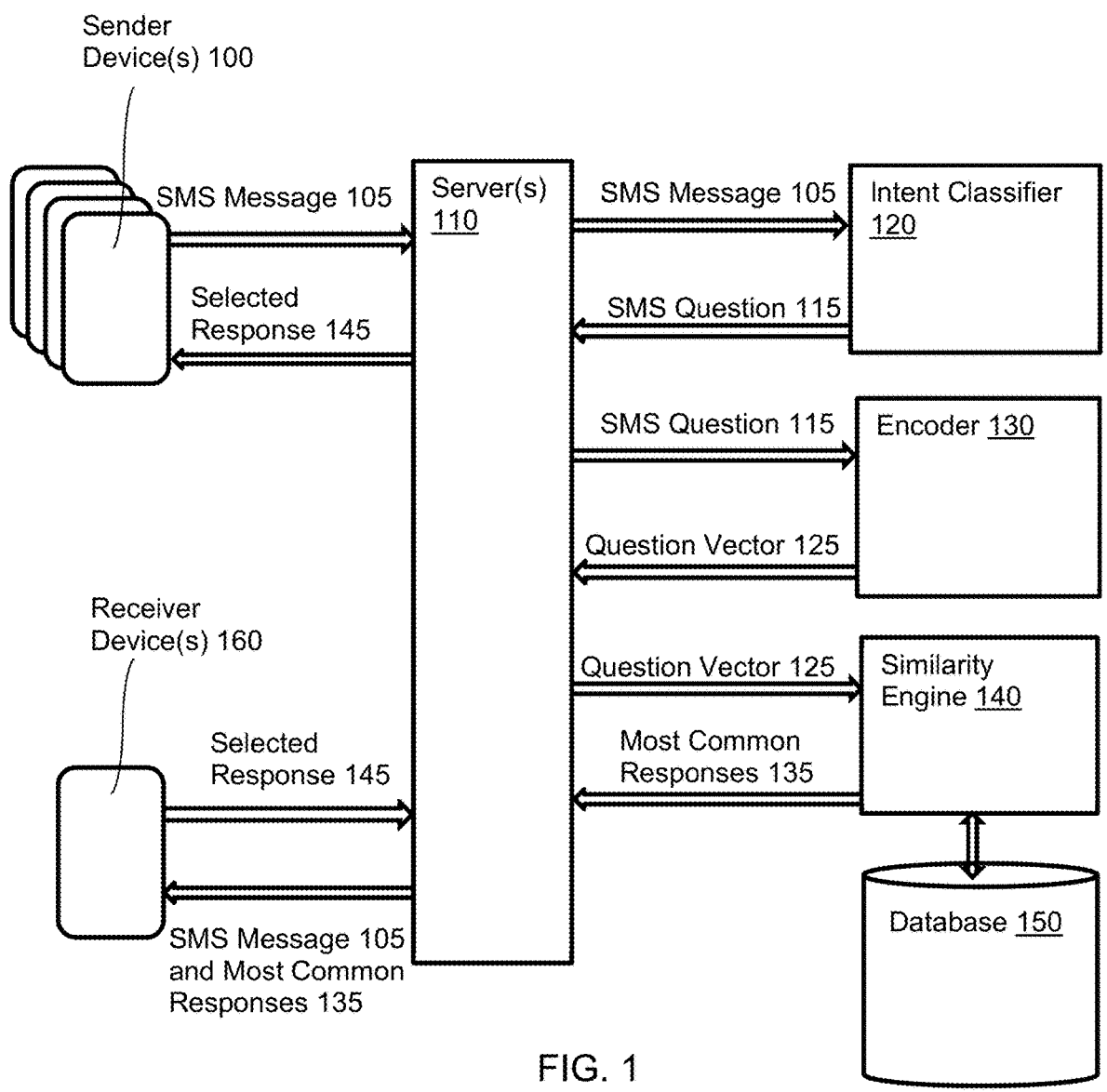
FIG. 1 is a block diagram of a system configured to receive an SMS message from a sender device addressed to a receiver device, determine similar SMS messages to the receiver device, determine one or more most common responses to the similar SMS messages, send the one or more most common responses as selectable responses to the receiver device and send a selected response to the sender device.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Figure 6:
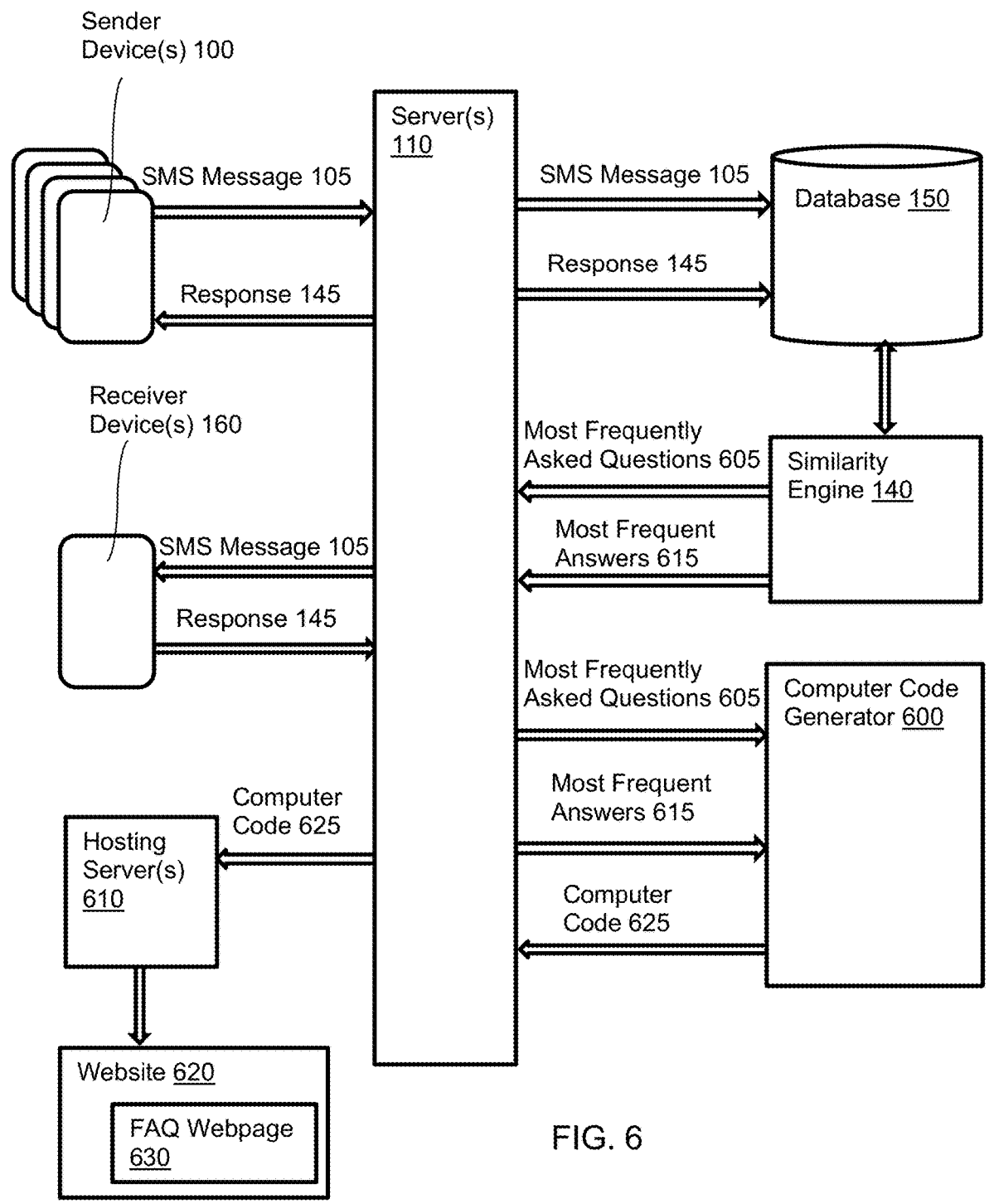
FIG. 6 is a block diagram of a system configured to receive an SMS message from a sender device and transmit the SMS message to a receiver device and then receive a response from the receiver device and transmit the response to the sender device. The SMS messages and responses collected by repeating this process may be stored in a database so that the most frequently asked questions and their answers may be determined.

Referring to FIGS. 1 and 6, the present invention may be practiced using one or more computer networks. The arrows in FIGS. 1 and 6 are preferably computer networks. A computer network is a collection of links and nodes (e.g., multiple computers and/or other client devices connected together) arranged so that information may be passed from one part of the computer network to another over multiple links and through various nodes. Examples of computer networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users on client devices. Hundreds of millions of people around the world have access to client devices connected to the Internet via Internet Service Providers (ISPs). Content providers place multimedia information (e.g., text, graphics, audio, video, animation, and other forms of data) at specific locations on the Internet referred to as websites 620. The combination of all the websites 620 and their corresponding webpages 630 on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Prevalent on the Internet are commercial websites 620, some of which may offer and sell goods and services to individuals and organizations. Websites 620 may consist of a single webpage, but typically consist of multiple interconnected and related webpages. Websites 620, unless very large and complex or have unusual traffic demands, typically reside on a single hosting server and are prepared and maintained by a single individual or entity (although websites 620 residing on multiple hosting servers 610, possibly geographically separated, is certainly possible and desirable in some instances). Menus, links, tabs, etc. may be used to move between different webpages within the website 620 or to move to a different website.

Websites 620 may be created using HyperText Markup Language (HTML) to generate a standard set of tags that define how the webpages for the website 620 are to be displayed. Websites 620 may comprise titles, tags and text. Users of the Internet may access websites 620 using software known as an Internet browser, such as MICROSOFT INTERNET EXPLORER or MOZILLA FIREFOX. After the browser has located the desired webpage 630, it requests and receives information from the webpage 630, typically in the form of an HTML document, and then displays the webpage 630 content for the user on the client device. The user may then view other webpages at the same website 620 or move to an entirely different website 620 using the browser.

Some Internet users, typically those that are larger and more sophisticated, may provide their own hardware, software, and connections to the Internet. Many Internet users either do not have the resources available or do not want to create and maintain the infrastructure necessary to host their own websites 620. To assist such individuals (or entities), hosting companies exist that offer website hosting services. These hosting providers typically provide the hardware, software, and electronic communication means necessary to connect multiple websites 620 to the Internet. A single hosting provider may literally host thousands of websites 620 on one or more hosting servers 610.

Businesses operating websites 620 may also communicate with their customers via other communication formats, such as Short Message Service (SMS). SMS is a text messaging service, although video, audio, pictures and graphics may also be transmitted, that is used by most telephone, Internet and mobile-device systems (sender device 100 or receiver device 160). SMS messages 105 that are text typically comprise a string of characters. SMS messages 105 may be an important part of a business when communicating with the customers of the business. Over time, customers (using their sender devices 100) may send similar questions to a business. The business (using its receiver device 160) may reply to similar questions with similar answers. As manually entering text into a receiver device 160 is time consuming, it is not very efficient in responding to customer questions to have to manually reenter the same or similar answers.

The present invention may assist a business that communicates with its customers using SMS messages 105 in two different embodiments, which may be performed separately or in combination. First, the invention may generate a plurality of most common responses 135 to a received SMS message 105, based on SMS messages 105 and responses stored in a database 150 that is indexed by receiver device 160, and present the one or more most common responses 135 as selectable items to the receiver device 160. This assists the business in quickly responding to questions from customers. And second, the invention may generate a frequently asked question webpage 630 based on the SMS messages 105 and responses exchanged between the sender device 100 (customer) and the receiver device 160 (business) that are stored in a database 150 indexed by receiver devices 160.

It should be appreciated that there may be a plurality of sender devices 100 and a plurality of receiver devices 160. However, the SMS messages 105 and responses to the SMS messages 105 are preferably grouped or indexed in a database 150 according to the receiver device 160 that received the SMS message 105 and the receiver device 160 that entered a response or selected a response to the SMS message 105. This has the advantage of not corrupting data for one receiver device 160 (first business) with data from another receiver device 160 (second business) and allows a single database 150 to store data for a plurality of different receiver devices 160 (businesses). This is important as responses to an SMS message 105 are likely to be different for each business represented by a receiving device. Specifically, an address/location, hours of operation and/or products or services offered are likely to be different for each business, so responses to the same or similar SMS messages 105 are likely to be different for each business.

Figure 2:
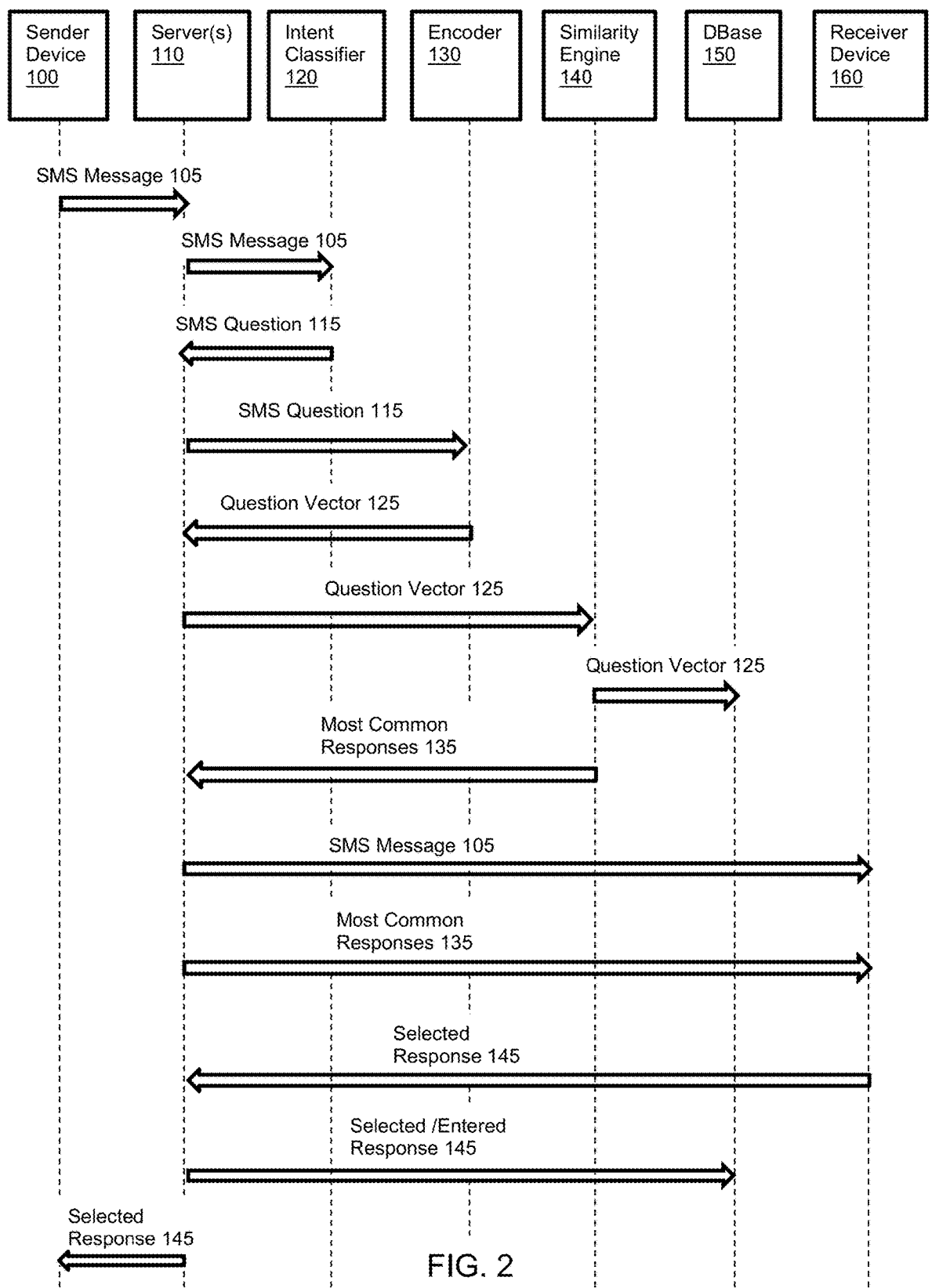
FIG. 2 is a process flow diagram illustrating a method to receive an SMS message from a sender device addressed to a receiver device, determine similar SMS messages to the receiver device, determine one or more most common responses to the similar SMS messages, send the one or more most common responses as selectable responses to the receiver device and send a selected response to the sender device.
Figure 3:
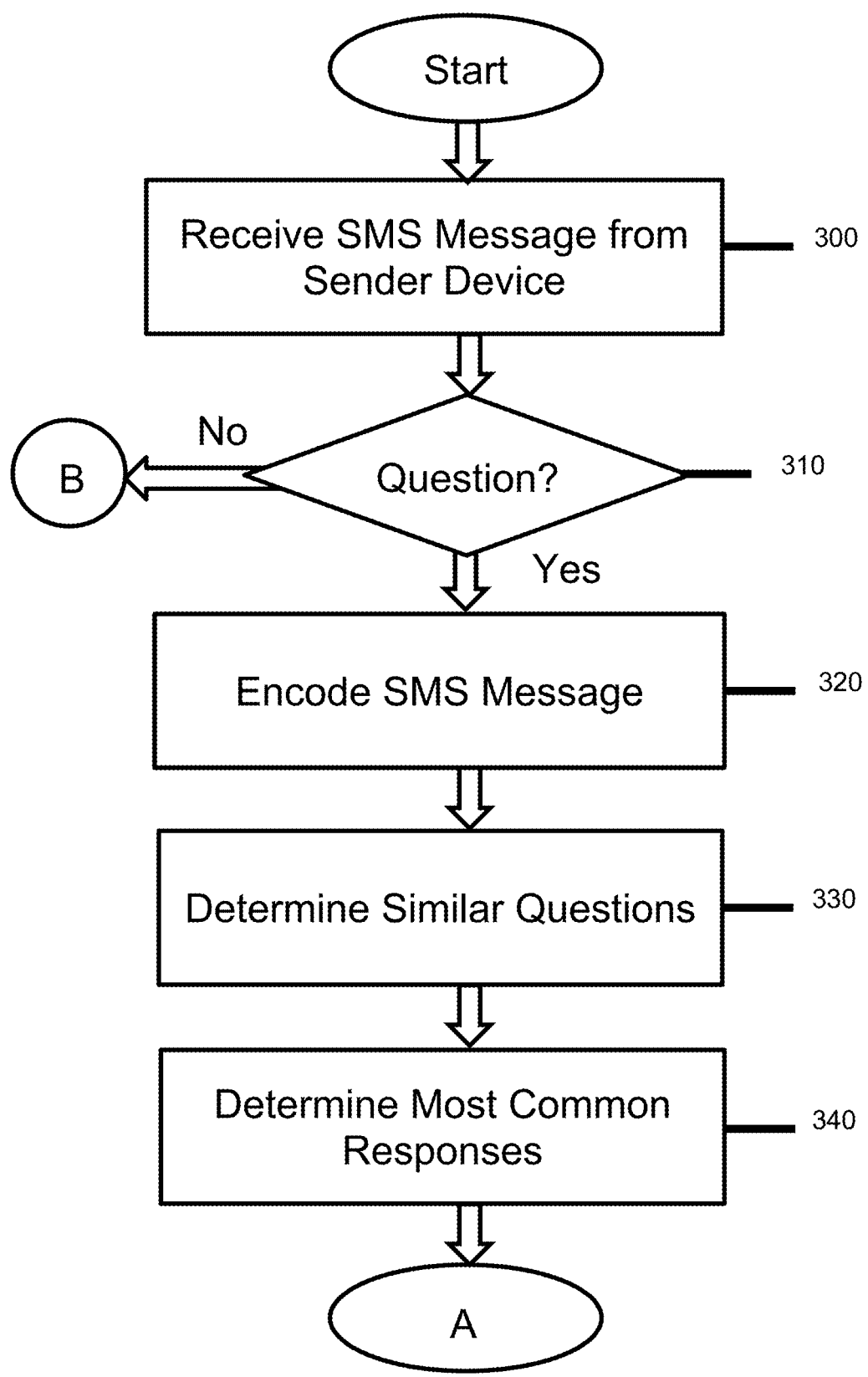
FIGS. 3 and 4 are a flowchart illustrating a method to receive an SMS message from a sender device addressed to a receiver device, determine similar SMS messages to the receiver device, determine one or more most common responses to the similar SMS messages, send the one or more most common responses as selectable responses to the receiver device and send a selected response to the sender device.
Figure 4:
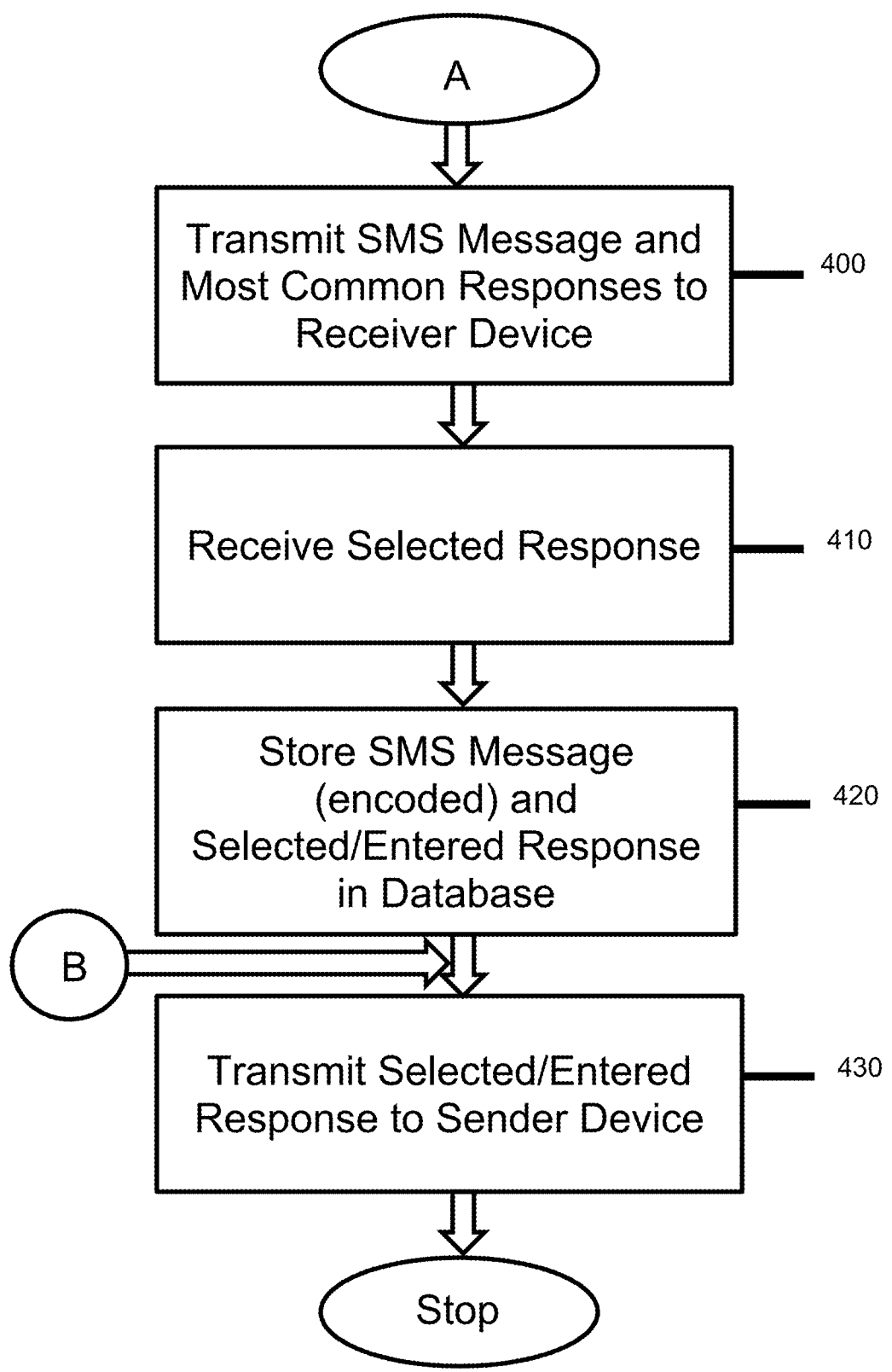

An example method of practicing the invention will now be discussed with reference to FIGS. 2, 3 and 4. In this embodiment, one or more servers 110 receive a plurality of SMS messages 105 from a plurality of sender devices 100. (Step 300) Each SMS message 105 is addressed to a receiver device 160, in a plurality of receiver devices 160.

An intent classifier 120 may determine whether the SMS message 105 is requesting information and is thus an SMS question 115. (Step 310) An intent classifier may determine whether the SMS message is requesting information and is thus an SMS question. As a non-limiting example, this may be determined using a training model. The training model may be trained on a training set using past text messages and data representing whether the text messages are or are not questions. Humans may be used to determine whether the text messages are or are not questions. Once the training model is trained, it may be used as part of the intent classifier to determine whether incoming text messages are or are not questions. In this embodiment, the intent classifier is not rule-based, but instead it's a function approximator which learns the typical structure of a question.

As other non-limiting examples, the intent classifier 120 may determine whether the SMS message 105 starts with "Who," "What," "Where," "When," or "How" and/or ends with a question mark. SMS messages 105 that starts with "Who," "What," "Where," "When," or "How" and/or end with a question mark may be determined to be SMS questions 115. In preferred embodiments, SMS messages 105 that are determined to not be SMS questions 115 are not stored in the database 150, but instead are merely transmitted to the receiver device 160 without further processing.

An encoder 130 may convert each SMS question 115 received from the sender devices 100 into a question vector 125 having a plurality of dimensions. (Step 320) Each dimension of the question vector 125 may mathematically represent a characteristic of the SMS question 115. Once each SMS question 115 is encoded into a question vector 125, the question vectors that are close to each other in high dimensional space are likely to be close to each other in meaning, while question vectors that are far apart from each other in high dimensional space are likely to have different meanings from each other. While any number of dimensions may be used, in preferred embodiments, each question vector 125 has at least 100 dimensions and more preferably has at least 300, 1000 or more dimensions.

Any desired characteristics of the SMS questions 115 may be used as one of the dimensions. As a non-limiting example, a first dimension may represent a first word in the SMS question 115, a second dimension may represent a second word in the SMS question 115 and so on for as many words as desired in the SMS question 115. If the SMS question 115 has fewer words than words used for dimensions, a default value, such as zero, may be used for non-existent words. Preselected words, articles, words that carry little meaning and/or are shorter than four letters may be ignored. In other embodiments only nouns and verbs from the SMS question 115 are used to encode into dimensions.

Each word in the English language (or the language of the SMS question 115) may be assigned a number such that words that have similar meanings have numbers that are close to each other while words that have different meanings have numbers that are not close to each other. As a specific example, the word "address" may be assigned the number 10,126 while the word "location" may be assigned the number 10,142. The words "address" and "location" have similar meanings and are thus assigned numbers that are close to each other. In contrast the word "bicycle" might be assigned 5,862 while the word "red" might be assigned 20,913 to indicate that the words "bicycle" and "red" are not closely related.

As another non-limiting example, a dimension might be a one to indicate that the words "location" or "address" are in the SMS question 115 while a zero might indicate the words "location" or "address" are not in the SMS question 115. As another non-limiting example, a dimension might be a one to indicate that the words "hours," "open," or "close" are in the SMS question 115 while a zero might indicate the words "hours," "open," or "close" are not in the SMS question 115.

As another non-limiting example, a dimension might be the number of words or characters in the SMS question 115. As another non-limiting example, a dimension might represent the number of nouns in the SMS question 115.

A similarity engine 140 may determine a plurality of most similar question vectors from a plurality of question vectors that have all been received by the same receiver device 160. (Step 330) Question vectors all received by the same receiver device 160 may be termed receiver device question vectors. The plurality of most similar question vectors may be determined based on being mathematically closer to the question vector 125 in high dimensional space as compared to other question vectors in the plurality of receiver device question vectors. Any method of determining how close question vectors are in high dimensional space may be used. As a non-limiting example, the similarity engine 140 may use a cosine distance or a cosine similarity algorithm to determine the plurality of most similar question vectors from the plurality of receiver device question vectors. As another non-limiting example, the similarity engine 140 may use a KNN algorithm to determine which question vectors in the plurality of receiver device question vectors are the plurality of most similar question vectors.

The question vectors and responses/selected responses 145 may be stored in a database 150, preferably indexed by a receiver device 160. This allows one database 150 to be used by a plurality of receiver devices 160 as the data may be grouped/indexed by each receiver device 160. Thus, in preferred embodiments, the plurality of receiver device question vectors are all derived from SMS questions 115 addressed to the receiver device 160 and the plurality of receiver device question vectors do not include SMS questions 115 not addressed to the receiver device 160. In other words, each receiver device 160 uses data only associated with that receiver device 160 and does not use data associated with any other receiver device 160. This prevents SMS questions 115 and response/selected responses 145 associated with other receiver devices 160 from corrupting the SMS questions 115 and response/selected responses 145 associated with the receiver device 160. Thus, the most common responses 135 are the most common responses 135 to the SMS question 115 by the receiver device 160 and not the most common responses 135 to the SMS question 115 by other receiver devices 160.

Once the plurality of most similar question vectors has been found, a corresponding plurality of most common responses 135 connected to the plurality of most similar question vectors may be determined from the database 150. Specifically, all of the responses may be determined from the plurality of most similar question vectors and then the most common of all of the responses may be determined to be the plurality of most common responses 135. In some cases, only a single response may be determined as the most common response 135 or two or three responses may be determined as the most common responses 135. Thus, the plurality of most common responses 135 may be based on a history of SMS message 105, stored in the database 150, received by the receiver device 160.

The SMS message 105 and one or a plurality of most common responses 135 may be transmitted to the receiver device 160. (Step 400) In preferred embodiments, the most common responses 135 are displayed and selectable on the receiver device 160. This allows a business operator or agent operating the receiver device 160 to select a common response to similar questions merely by tapping on a selected response 145 as opposed to the business operator or agent having to type the message 105 into the receiver device 160. Thus, a selected response 145 selected from the one or the plurality of most common responses 135 may be receiving from the receiver device 160. (Step 410) The business operator or agent may ignore the one or more selectable common responses and enter in a manual response.

Figure 10:
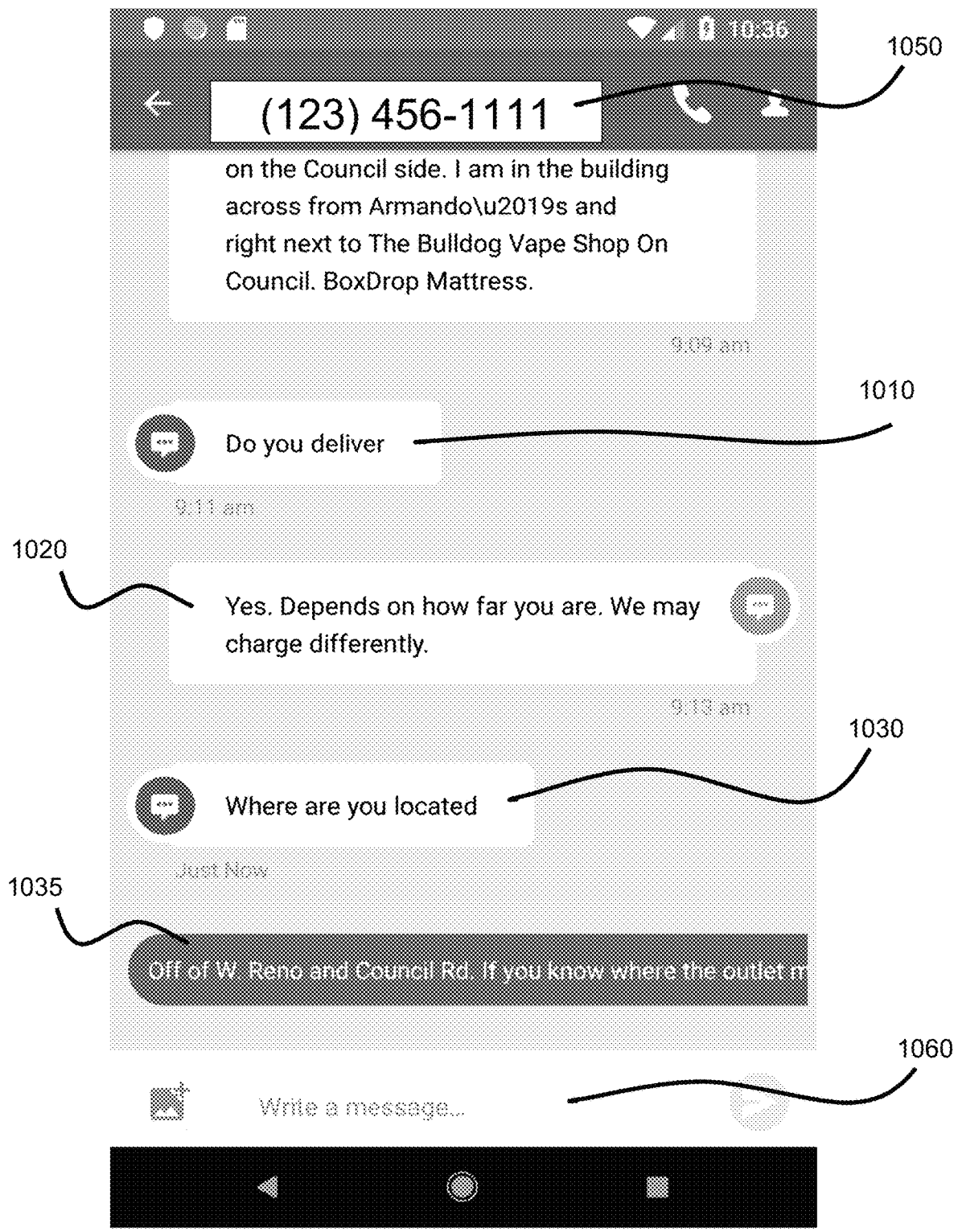
FIGS. 10-13 is an example interface on a sender device or a receiver device illustrating example SMS messages, which could be in the form of statements, questions or responses.

Referring to FIG. 10, an SMS message 1010 "Do you deliver" (which is also an SMS question 115) is displayed on an example interfaced of a receiver device 160. A response 1020 to this SMS question 115 is displayed as "Yes. Depends on how are you are. We may charge differently." The SMS question 1010 and response 102 may be associated with each other. The receiver device 160 also displays the SMS message 105 of "Where are you located" followed by a selectable response 1035 "Off of W. Reno and Council Rd. If you know where the outlet . . . ." The receiver device interface may also display a telephone number 1050 of a sender. In the illustrated example, a sender device 100 with a telephone number 1050 of (123) 456-1111 is sending the SMS messages 105. The receiver device interface may also have an area 1060 configured for allowing a response to be manually entered into the receiver device 160.

Figure 11:
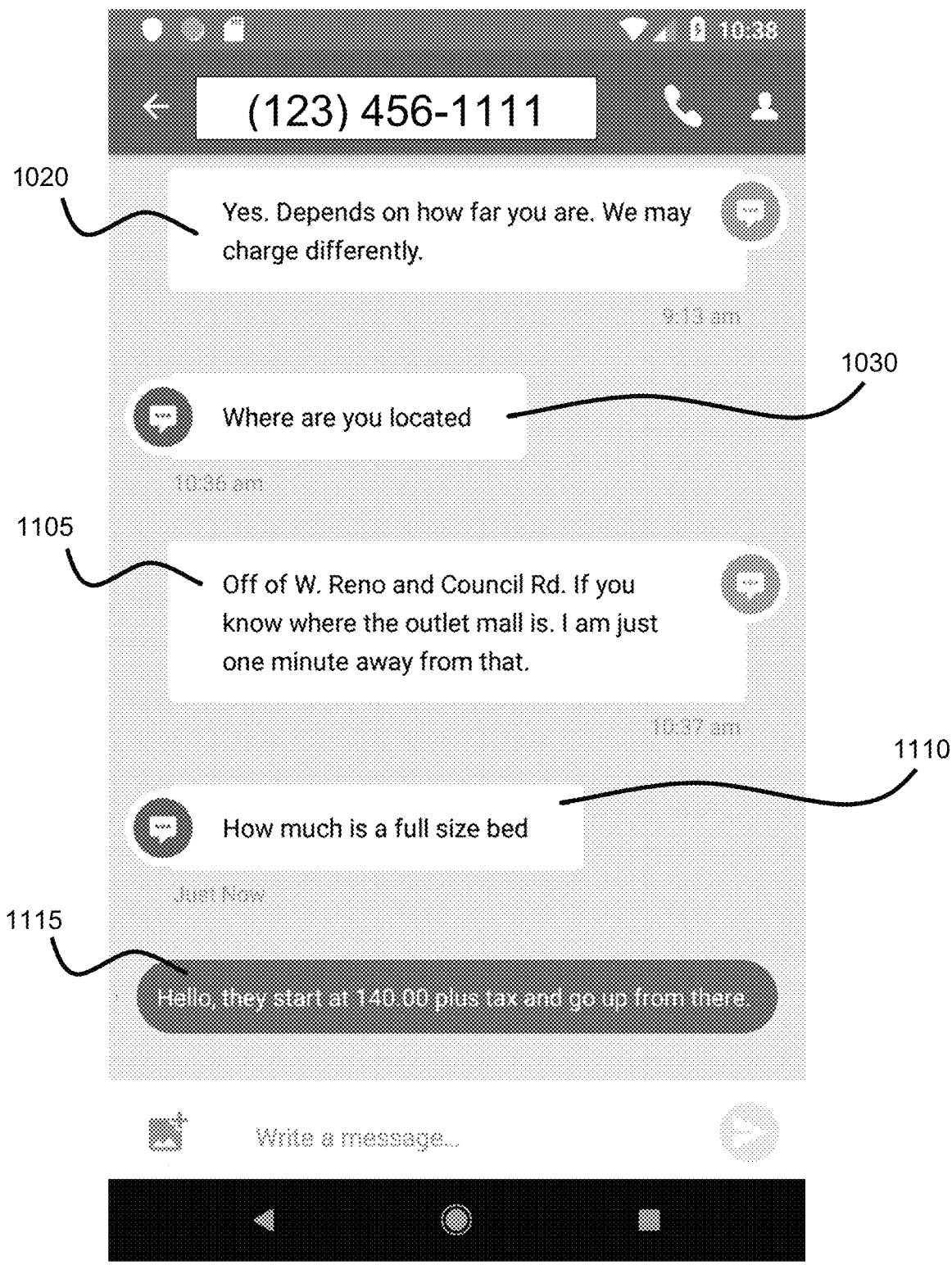

Referring to FIG. 11, a response 11105 of "Off of W. Reno and Council Rd. If you know where the outlet mall is. I am just one minute from that." If the selectable response 1035 was selected in FIG. 10, then the selectable response 1035 may appear as the response 1105 in FIG. 11. Another SMS message 1110, which is also an SMS question 115, of "How much is a full size bed" appears on the receiver device interface. After the SMS question 1110 a selectable response 1115 of "Hello, they start at 140.00 plus tax and go up from there." is displayed.

Figure 12:
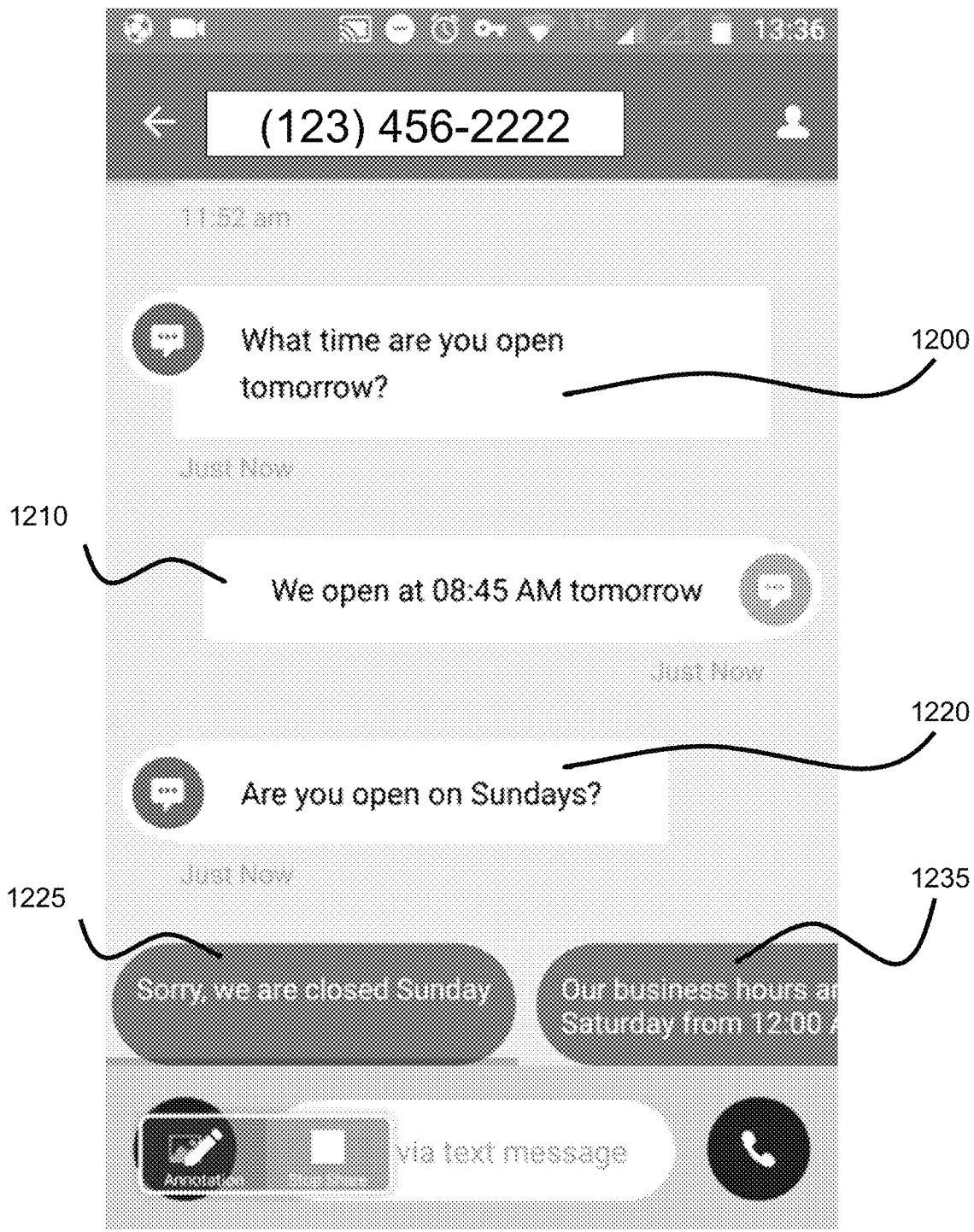
Figure 13:
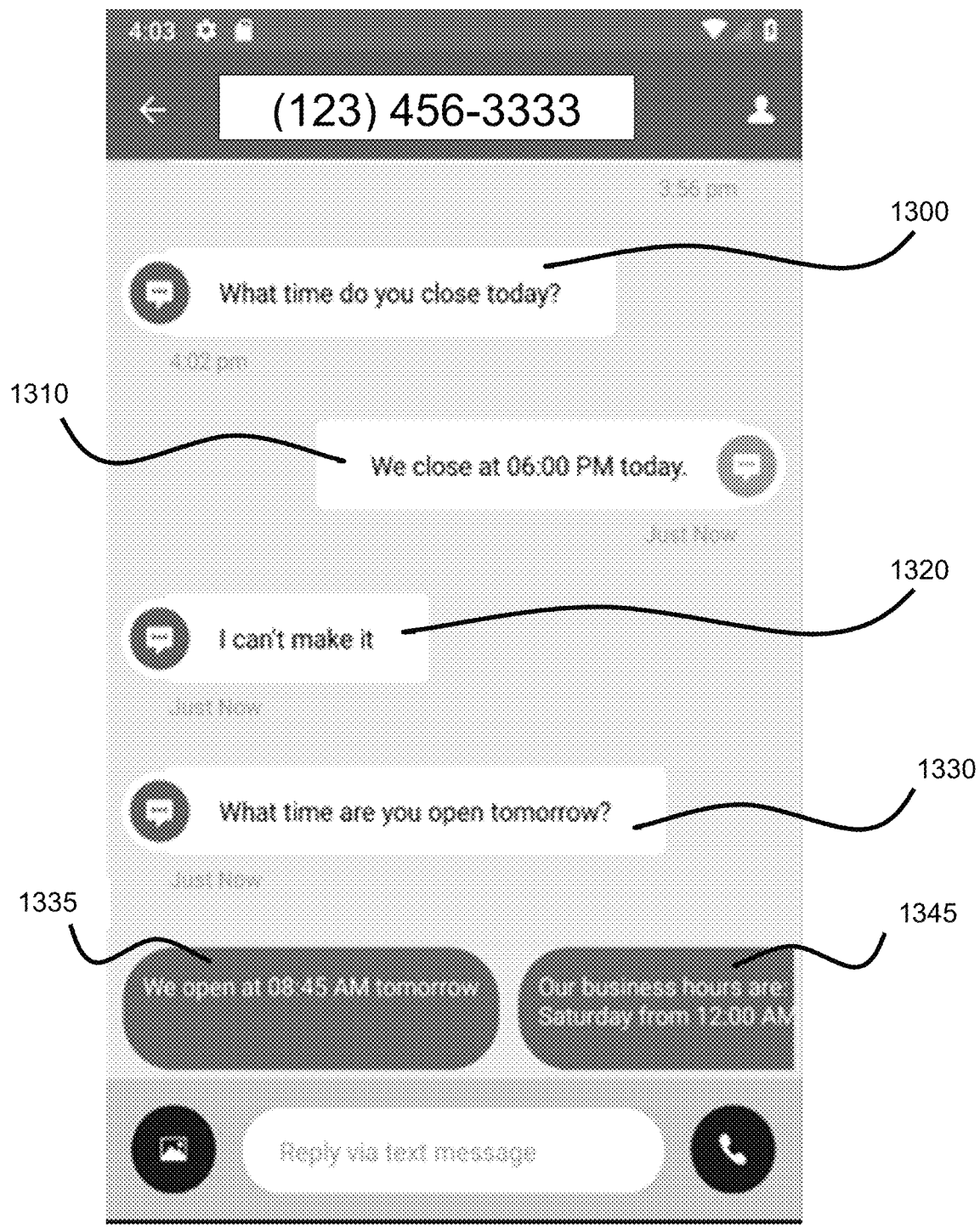

Referring to FIG. 12, an SMS message/question 1200 is displayed on an example interface of a receiver device 160 as "What time are you open tomorrow?" An associated response 1210 of "We open at 08:45 AM tomorrow" is then displayed directly below. Another SMS message/question 1220 "Are you open on Sundays?" is then displayed. The interface of the receiver device 160 then displays a plurality of selectable responses 1225, 1235 that have been determined to be the two most common responses 135 to the question 1220 or to similar questions. Specifically, the interface for the receiver device 160 displays the selectable options of "Sorry, we are closed Sunday" 1225 and "Our business hours are: Saturday from 12:00 AM."

Referring to FIG. an SMS message/question 1300 is displayed on an example interface of a receiver device 160 as "What time do you close today?" An example response 1310 of "We close at 06:00 PM today." may be associated with the SMS message/question 1300. SMS message 1320 of "I can't make it" may be displayed, but is preferably not processed as an SMS question 115 or stored in the database 150. The SMS message/question 1330 of "What time are you open tomorrow?" may then be displayed on the receiver device 160. The invention may determine and then display, as non-limiting examples a first selectable response 1335 of "We open at 08:45 AM tomorrow" and a second selectable response of 1345 of "Our business hours are: Saturday from 12:00 AM."

The SMS questions 115, question vectors and/or the entered or selected responses 145 may be stored in the database 150. The SMS questions 115, question vectors and/or the entered or selected responses 145 are preferably associated with each other and placed in a device group indexed by the receiver device 160. In other words, the data is grouped or indexed according to the receiver device 160 that actually received the SMS question 115 and entered/selected the response. (Step 420)

In another embodiment, computer code 625 may be generated for a webpage 630 for a website 620 using a plurality of SMS messages 105 to a receiver device 160 and a plurality of responses from the receiver device 160.

Figure 7:
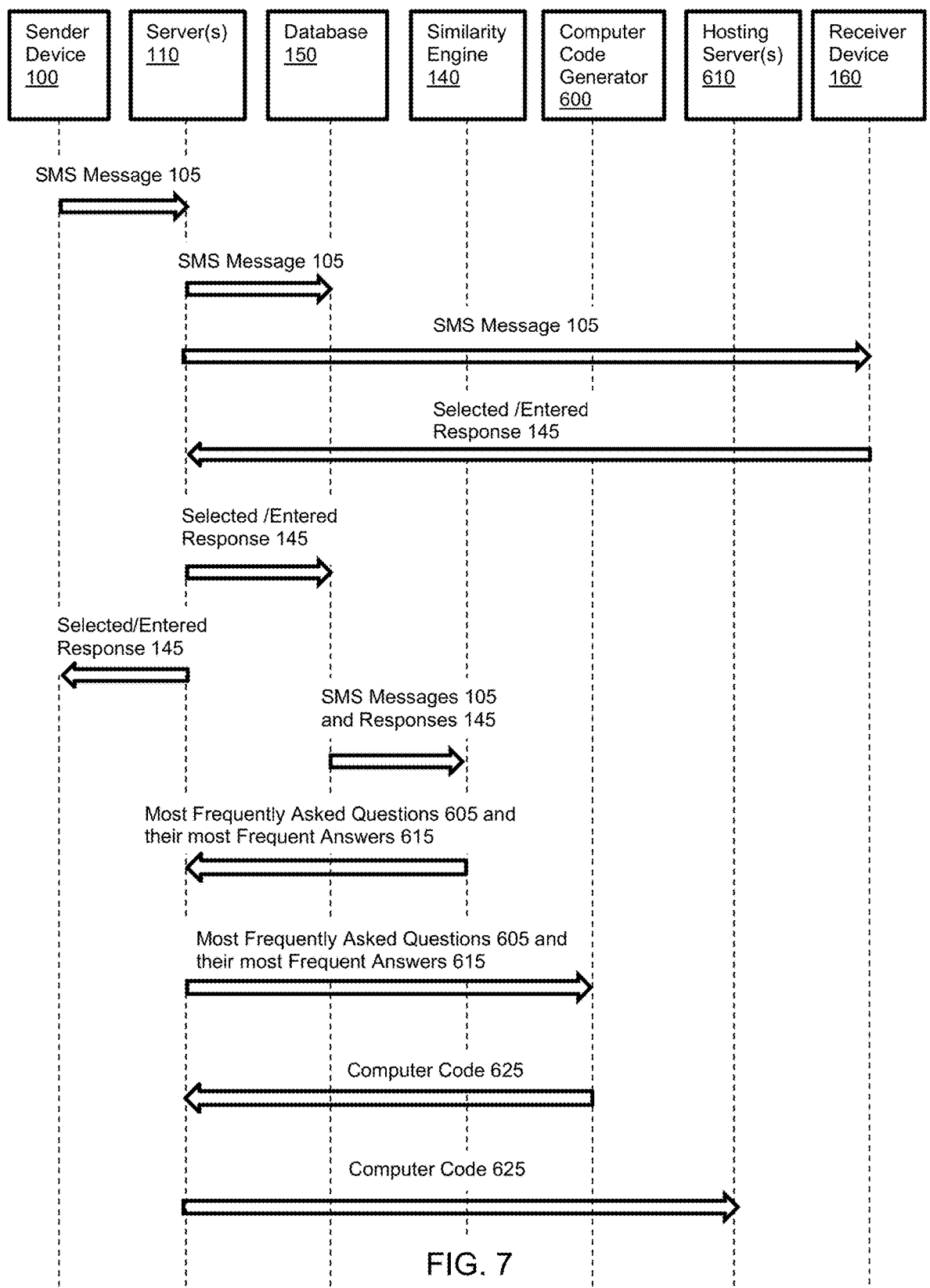
FIG. 7 is a process flow diagram illustrating a method to receive an SMS message from a sender device and transmit the SMS message to a receiver device and then receive a response from the receiver device and transmit the response to the sender device. The SMS messages and responses collected by repeating this process may be stored in a database so that the most frequently asked questions and their answers may be determined.
Figure 8:
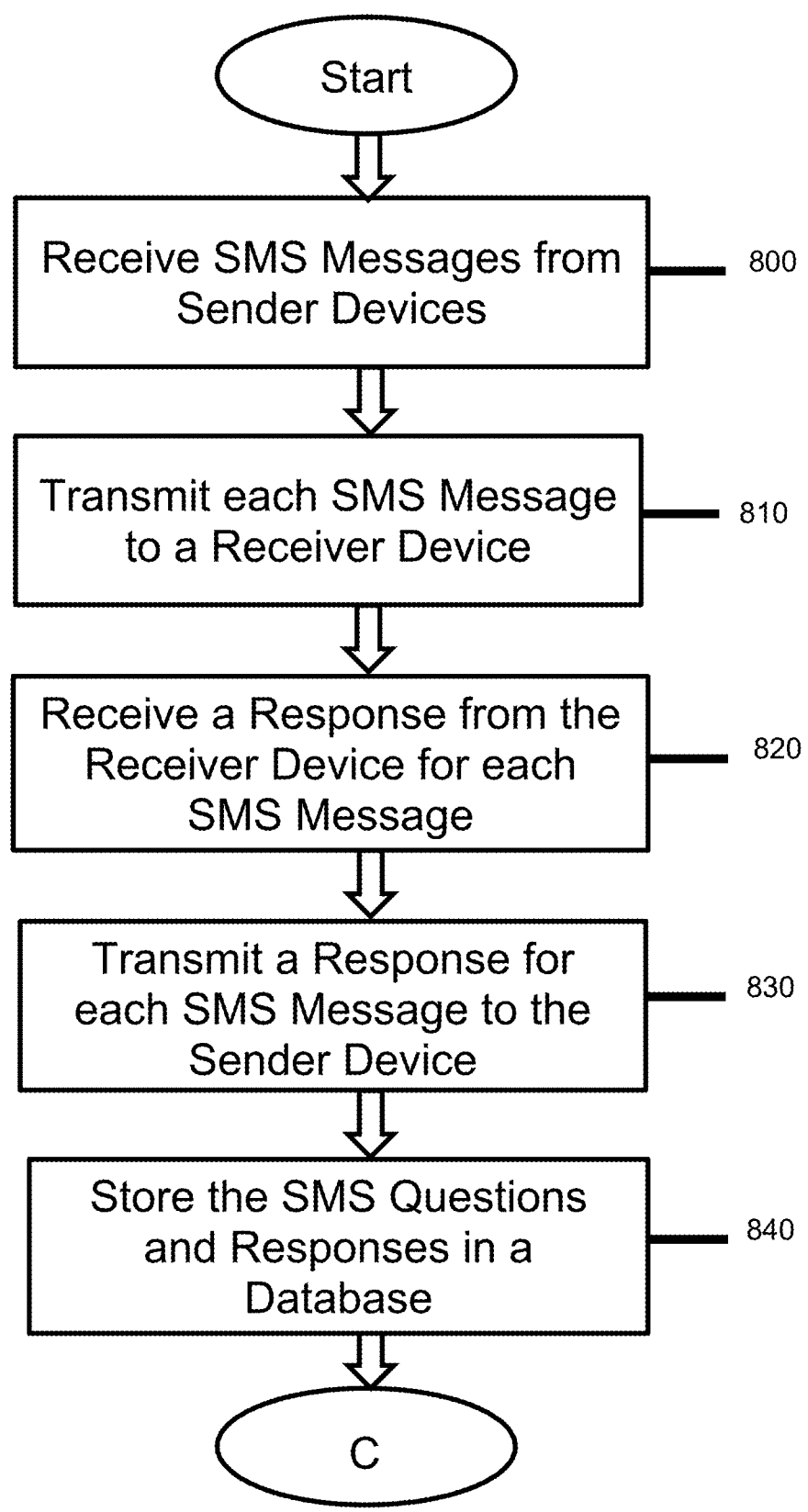
FIGS. 8 and 9 are a flowchart illustrating a method to receive an SMS message from a sender device and transmit the SMS message to a receiver device and then receive a response from the receiver device and transmit the response to the sender device. The SMS messages and responses collected by repeating this process may be stored in a database so that the most frequently asked questions and their corresponding answers may be determined. This data may be used to build a webpage of a website.
Figure 9:
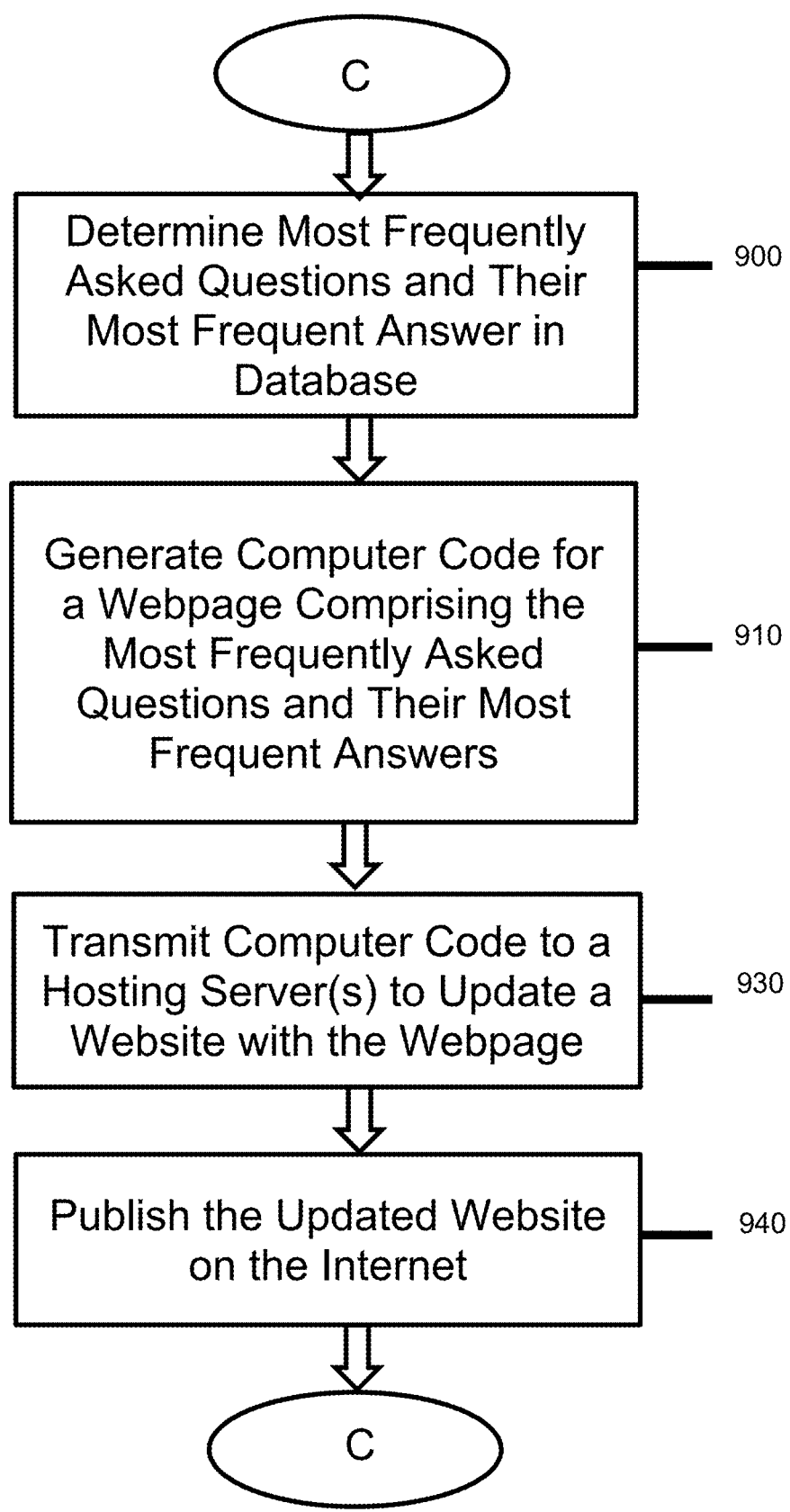

Another example method of practicing the invention will now be discussed with reference to FIGS. 7, 8 and 9. The plurality of SMS messages 105 may be received from a plurality of sender devices 100. (Step 800) The plurality of SMS messages 105 are preferably all addressed to the same receiver device 160 and each SMS message 105 in the plurality of SMS messages 105 comprises a string of characters. Each SMS message 105 in the plurality of SMS messages 105 may be transmitted to the receiver device 160. (Step 810) Some of the SMS messages 105 may be determined to be questions using an intent classifier 120 as previously discussed.

A response may be received to each of the SMS questions 115 in the plurality of SMS questions 115 from the receiver device 160. (Step 820) The response for each of the SMS questions 115 may be transmitted to the sender device 100 that sent the SMS message 105. (Step 830) The plurality of SMS messages 105 and/or SMS questions 115 and the corresponding plurality of responses may be stored, indexed according to the receiver device 160, in a database 150. (Step 840)

A plurality of most frequently asked questions 605 in the plurality of SMS messages 105 or SMS questions 115 may be determined. This may be performed by encoding all of the SMS questions 115 into question vectors as previously described. All of the SMS question vectors that are within a predetermined mathematical distance in high dimension space may be considered as one question. The most frequently asked questions 605 may then be determined by counting the times each question (or closely related group of questions) has been asked. The questions or closely related group of questions that have been asked the most times by various sender devices 100 to the same receiver device 160 may be determined to be the plurality of most frequently asked questions 605.

In another embodiment, a plurality of most frequently asked questions 605 in the plurality of SMS messages 105 or SMS questions 115 may be determine. An encoder 130 may convert the plurality of SMS messages 105 into a plurality of corresponding question vectors. Each question vector 125 may have any desired number of dimensions, such as, as a non-limiting example, 10 dimensions. A similarity engine 140 may group the plurality of question vectors into a plurality of question groups, wherein each question group comprises question vectors that are determined to be similar based on being mathematically close to each other in high dimensional space. One or more servers 110 may determine the plurality of most frequently asked questions 605 based on question groups in the plurality of question groups comprising the most question vectors.

For each question in the plurality of most frequently asked questions 605 a most frequently answer 615 may be determined so that each question in the plurality of most frequently asked questions 605 corresponds to an answer. Thus, a plurality of most frequently answers 615 may be generated where each answer corresponds to one of the plurality of most frequently asked questions 605. (Step 900)

A website 620 may be determined that corresponds to the receiver device 160 using any desired method. As a non-limiting example, the website 620 may be automatically determined, by one or more servers 110, from a customer account of the business with the receiver device 160. In another embodiment, a business operator or agent may enter website(s) 620 that are related to the communications with the receiver device 160.

One or more servers 110 may generate computer code 625 for a webpage 630 for the website 620, determined to be associated with the receiver device 160, using the plurality of most frequently asked questions 605 and their corresponding plurality of most frequently answers 615. (Step 910) In a preferred embodiment, the computer code 625 of the webpage 630 for the website 620 presents the plurality of most frequently asked questions 605 in order from most frequent to least frequent followed by the most frequently answer 615 to its corresponding question. While the computer code 625 may be in any computer language, in preferred embodiments the computer code 625 is written in HTML.

The computer code 625 may be transmitted to one or more hosting servers 610. The computer code 625 may be used by the one or more hosting servers 610 to update the computer code 625 for the website 620 so that the website 620 now displays a new or updated webpage 630 with the most frequently asked questions 605 and their corresponding most frequently answer 615. (Step 930)

The one or more hosting servers 610 may publish the website 620, with the generated webpage 630, to the Internet. Thus, the website 620 may include the webpage 630 generated from SMS messages 105, stored in the database 150, received by and transmitted from the receiver device 160. (Step 940)

Referring to FIGS. 5A and 5B, an example database 150 is illustrated. The database 150 may be organized in any desired manner. As a non-limiting example, as illustrated in FIGS. 5A and 5B, the database 150 may be organized in the format of a table. In preferred embodiments, the SMS questions 115, question vectors and responses/selected responses 145 that are related are organized together according to the receiving device that received/transmitted them. As specific examples, the SMS questions 115, question vectors and responses/selected responses 145 are sorted by or indexed by the receiver device #1 160, receiver device #2 500 and receiver device #3 510.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method comprising:
receiving, by at least one server, a Short Message Service (SMS) message from a sender device, wherein the SMS message is addressed to a receiver device of a plurality of receiver devices and the SMS message comprises a string of characters;
determining, by the at least one server utilizing an intent classifier, that the SMS message is requesting information and is an SMS question;
converting, by the at least one server utilizing an encoder, the SMS question into a question vector, wherein the question vector comprises a vector having at least 200 dimensions;
determining, by the at least one server utilizing a similarity engine, based on the question vector, a plurality of most similar question vectors from a plurality of receiver device question vectors stored in a database, wherein:
the plurality of receiver device question vectors are all derived from other SMS questions addressed to the receiver device,
the plurality of receiver device question vectors do not include SMS questions not addressed to the receiver device, and
the plurality of most similar question vectors are determined based on being mathematically closer to the question vector in high dimensional space as compared to other question vectors in the plurality of receiver device question vectors;
determining, by the at least one server, a plurality of most common responses connected to the plurality of most similar question vectors of a plurality of most frequently asked questions, wherein questions or closely related group of questions that have been asked the most times by a plurality of different sender devices to the same receiver device is automatically determined to be the plurality of most frequently asked questions;
transmitting, by the at least one server, the SMS message and the plurality of most common responses to the receiver device, wherein the most common responses are displayed and selectable on the receiver device;
receiving, by the at least one server, from the receiver device a selected most common response selected from the plurality of most common responses;
storing, by the at least one server, the question vector and the selected most common response in the database, wherein the question vector and the selected most common response are associated with each other and placed in a device group indexed by the receiver device; and
transmitting, by the at least one server, the selected most common response to the sender device.

2. The method of claim 1, wherein the similarity engine uses a cosine distance or a cosine similarity to determine the plurality of most similar question vectors from the plurality of receiver device question vectors.

3. The method of claim 1, wherein the similarity engine uses a KNN algorithm to determine which question vectors in the plurality of receiver device question vectors are the plurality of most similar question vectors.

4. The method of claim 1, wherein the most common responses are the most common responses to the SMS question by the receiver device and not the most common responses to the SMS question by other receiver devices.

5. The method of claim 1, wherein the SMS message and the SMS question are not stored in the database.

6. The method of claim 1, wherein:
the database stores a plurality of question vectors, each question vector in the plurality of question vectors comprising a vector having 200 or more dimensions,
the plurality of question vectors are grouped into a plurality of device groups according to a receiver device that received the SMS message used to create the question vector, and each question vector in the plurality of question vectors is associated with one and only one response and each response comprises a string of characters.

7. The method of claim 1, wherein each of the plurality of receiver device question vectors is received by the same receiver device and not by any other receiver device.

8. The method of claim 1, wherein the question vector comprises a vector having at least 10 dimensions.

9. The method of claim 1, wherein the plurality of question vectors stored in the database are separated into a plurality of device groups and each device group in the plurality of device groups contains only question vectors created from SMS messages received from the same receiver device.

10. The method of claim 1, wherein the plurality of most common responses are based on a history of SMS message, stored in the database, received by the receiver device.

11. A system comprising:
at least one server, storing computer code;
wherein, when executing the computer code, the at least one server is configured to:
receive a Short Message Service (SMS) message from a sender device, wherein the SMS message is addressed to a receiver device of a plurality of receiver devices and the SMS message comprises a string of characters;
convert, utilizing an encoder, the SMS message into a question vector, wherein the question vector comprises a vector having at least 200 dimensions;
determine, utilizing a similarity engine, based on the question vector, a plurality of most similar question vectors from a plurality of receiver device question vectors stored in a database, wherein:
the plurality of receiver device question vectors are all derived from other SMS questions addressed to the receiver device,
the plurality of receiver device question vectors do not include SMS questions not addressed to the receiver device, and
the plurality of most similar question vectors are determined based on being mathematically closer to the question vector in high dimensional space as compared to other question vectors in the plurality of receiver device question vectors;
determine a plurality of most common responses connected to the plurality of most similar question vectors of a plurality of most frequently asked questions, wherein questions or closely related group of questions that have been asked the most times by a plurality of different sender devices to the same receiver device is automatically determined to be the plurality of most frequently asked questions;
transmit the SMS message and the plurality of most common responses to the receiver device, wherein the most common responses are displayed and selectable on the receiver device;
receive from the receiver device a selected most common response selected from the plurality of most common responses;
store the question vector and the selected most common response in the database, wherein the question vector and the selected most common response are associated with each other and placed in a device group indexed by the receiver device; and
transmit the selected most common response to the sender device.

12. The system of claim 11, wherein the similarity engine uses a cosine distance or a cosine similarity to determine the plurality of most similar question vectors from the plurality of receiver device question vectors.

13. The system of claim 11, wherein the similarity engine uses a KNN algorithm to determine which question vectors in the plurality of receiver device question vectors are the plurality of most similar question vectors.

14. The system of claim 11, wherein the most common responses are the most common responses to the SMS question by the receiver device and not the most common responses to the SMS question by other receiver devices.

15. The system of claim 11, wherein the SMS message and the SMS question are not stored in the database.

16. The system of claim 11, wherein:
the database stores a plurality of question vectors, each question vector in the plurality of question vectors comprising a vector having 200 or more dimensions,
the plurality of question vectors are grouped into a plurality of device groups according to a receiver device that received the SMS message used to create the question vector, and
each question vector in the plurality of question vectors is associated with one and only one response and each response comprises a string of characters.

17. The system of claim 11, wherein each of the plurality of receiver device question vectors is received by the same receiver device and not by any other receiver device.

18. The system of claim 11, wherein the question vector comprises a vector having at least 10 dimensions.

19. The system of claim 11, wherein the plurality of question vectors stored in the database are separated into a plurality of device groups and each device group in the plurality of device groups contains only question vectors created from SMS messages received from the same receiver device.

20. The system of claim 11, wherein the plurality of most common responses are based on a history of SMS message, stored in the database, received by the receiver device.

* * * * *